United States Patent [19]
Bridges

[11] 4,448,078
[45] May 15, 1984

[54] THREE-WIRE STATIC STRAIN GAGE APPARATUS

[75] Inventor: William F. Bridges, Palm City, Fla.

[73] Assignee: The United States of America as represented by the Secretary of the Air Force, Washington, D.C.

[21] Appl. No.: 444,006

[22] Filed: Nov. 23, 1982

[51] Int. Cl.³ .............................................. G01B 7/18
[52] U.S. Cl. ........................................ 73/766; 338/3; 324/DIG. 1
[58] Field of Search ...................... 73/763, 862.48, 766; 338/2, 3, 7; 323/365, 367; 324/DIG. 1

[56] References Cited

U.S. PATENT DOCUMENTS

| | | | |
|---|---|---|---|
| 2,672,048 | 3/1954 | Ruge | 338/3 X |
| 3,245,252 | 4/1966 | First | 73/766 |
| 3,281,657 | 10/1966 | Steel | 324/DIG. 1 |
| 3,290,928 | 12/1966 | Curry | 338/3 X |
| 3,665,756 | 5/1972 | Russell | 338/3 X |

FOREIGN PATENT DOCUMENTS

| | | | |
|---|---|---|---|
| 705374 | 12/1979 | U.S.S.R. | 73/763 |
| 781555 | 11/1980 | U.S.S.R. | 73/763 |
| 842592 | 6/1981 | U.S.S.R. | 73/763 |
| 898260 | 1/1982 | U.S.S.R. | 73/763 |

*Primary Examiner*—Gerald Goldberg
*Assistant Examiner*—Vince Kovalick
*Attorney, Agent, or Firm*—Donald J. Singer; William Stephanishen

[57] ABSTRACT

A three-wire static strain gage apparatus utilizing a switching unit in combination with a Wheatstone bridge circuit to make strain gage measurements which are temperature corrected by switching to a temperature gage to measure the strain gage circuit's temperature at the time of the strain measurement.

5 Claims, 1 Drawing Figure

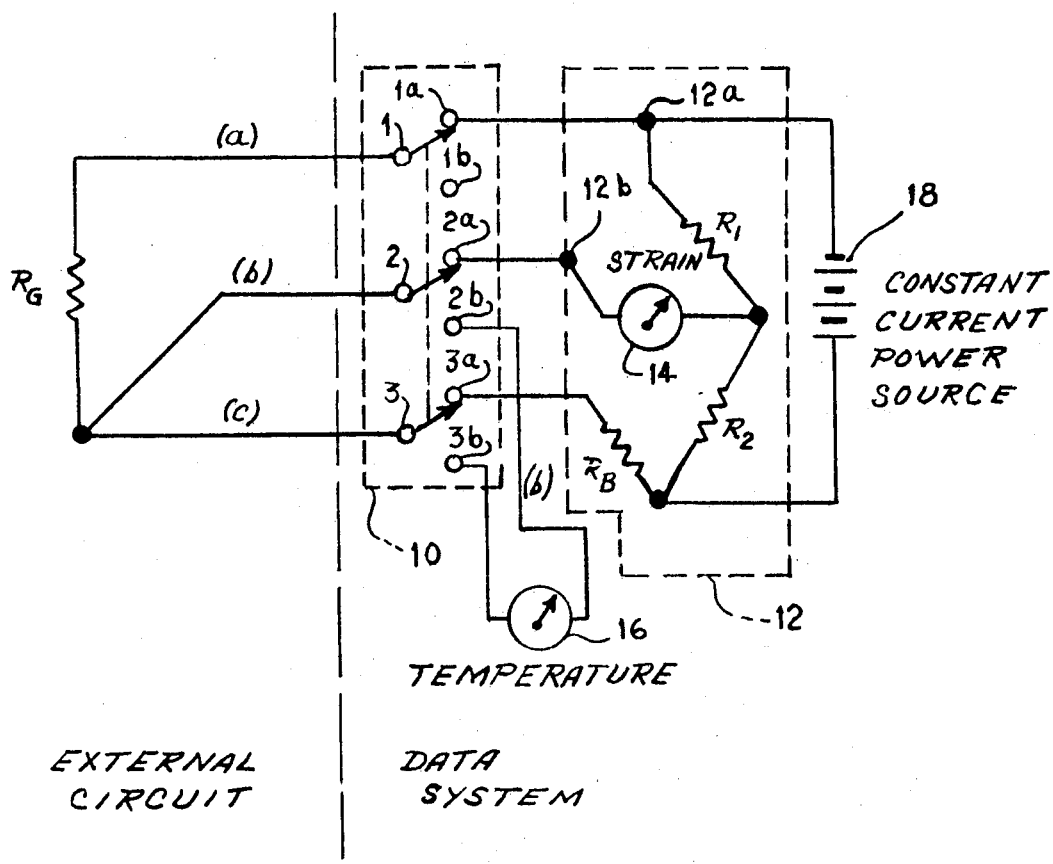

THREE-WIRE STATIC STRAIN GAGE APPARATUS

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to a strain gage apparatus, and in particular to a three-wire static strain gage apparatus.

In the prior art, it has been well understood that the electrical resistance of electrically conductive metals varies in accordance with the function of the strain to which they are subjected. This phenomenon is termed strain-sensitivity and has been utilized in the so-called metal foil and wire-wound types of strain gages. These strain gages generally employ a length or a plurality of series-connected parallel lengths of fine wire, which is known as a grid or filament, that is bonded by a suitable adhesive to the member to be stressed wherein the strain on the member is imparted to the wire. The resultant strain causes a variation in the electrical resistance of the strain sensitive wire that is usually measured by a Wheatstone bridge in which the strained wire comprises one leg of the bridge. The bridge recording or indicating device, such as a galvanometer, may be conveniently calibrated to give a reading of strain in inches per inch which may be computed to provide stress in pounds per square inch.

Whenever a strain gage is bonded to a test member for the purpose of measuring the strain of the member due to varying load conditions, the overall strain reading may be adversely affected by a condition that is commonly known as the apparent strain. The apparent strain may be defined as a strain indication that is generated in response to a thermal expansion of the material engaged, the temperature resistance coefficient of the strain gage wire, and changes in strain gage lead wire resistance due to temperature variations. It may be seen that the apparent strain is undesirable since the strain reading will not represent a true conversion of stress and strain forces which are placed on the test member but will include expansion effects that are caused by variations in temperature.

One conventional prior art method of temperature compensation is to employ a strain sensing gage which is constructed made of specially selected wire materials which can be used on test members within a predetermined temperature range for which the gage materials have been selected. This method has been successfully employed for a limited temperature range and generally required controlled test conditions. Another technique for providing temperature compensation involves the employment of a dummy gage which is placed in close proximity to the strain sensing gage. The dummy gage is generally inserted in an adjacent leg of the Wheatstone bridge circuit so that a cancellation occurs when the resistance values and the temperature changes are at all times identical. However, because of temperature differences between the sensing strain gage and the dummy gage due to convective air currents for example, the resistance of the two gages are not equal and compensation for such transit temperatures cannot be readily obtained.

SUMMARY OF THE INVENTION

The present invention utilizes a static strain gage which is connected in a three wire-configuration to a Wheatstone bridge to provide a temperature compensated strain output. A three wire switching arrangement is utilized to wire the strain gage in one switch position to the bridge and in the second switch position to a temperature gage to thereby permit accurate temperature measurements and also provide a means for a more accurate strain gage signal correction.

It is one object of the invention, therefore, to provide an improved three static strain gage apparatus.

It is another object of the invention to provide an improved three wire static strain gage apparatus in which the strain gage is wired to the Wheatstone bridge with thermal compensating leadwire.

It is another object of the invention to provide an improved three wire static strain gage apparatus wherein a switching circuit is utilized to permit accurate temperature measurements.

It is another object of the invention to provide an improved three wire static strain gage apparatus wherein a constant-current power source is utilized for applying the strain gage correction signal to the strain gage.

These and other advantages, objects and features of the invention will become more apparent after considering the following description taken in conjunction with the illustrative embodiment in the accompanying drawings.

BRIEF DESCRIPTION OF THE DRAWING

The sole FIGURE is a schematic diagram of the three wire static strain gage apparatus according to the present invention.

DESCRIPTION OF THE PREFERRED EMBODIMENT

Referring now to the sole FIGURE, there is shown a three wire static strain gage apparatus comprising an external circuit and a data system circuit. The external circuit comprises the strain gage, $R_g$ and its associated wiring leads a, b and c. The strain gage circuit is connected to the data system circuit by means of a switching unit 10. The switching unit 10 comprises a two position three pole switch. The first switch pole is wired to strain gage leadwire a, the second switch pole is wired to strain gage leadwire b, and the third switch pole 3 is wired to strain gage leadwire c. The first switch position 1a of the first switch pole 1 is wired to the top 12a of the Wheatstone bridge unit 12. The second switch position 1b of the first switch pole 1 is open. The first switch position 2a of the second switch pole 2 is wired to point 12b which is the midpoint of one side of the Wheatstone bridge unit 12 and is connected to one end of the strain gage measuring unit 14. The second switch position 2b of the second switch pole 2 is connected to one side of a temperature measuring unit 16. The first switch position 3a of the third switch pole 3 is connected to one end of resistor $R_B$ which comprises one leg of the Wheatstone bridge unit 12. The second switch position 3b of the third switch pole 3 is connected to the other side of the temperature measuring unit 16.

The Wheatstone bridge unit 12 comprises a conventional Wheatstone bridge circuit configuration which is modified to contain a switching unit 10 in one side of the bridge circuit. The Wheatstone bridge unit 12 comprises first and second resistors $R_1$, $R_2$ which are connected in series. The first and second resistors, $R_1$, $R_2$ are typically the same resistance value and comprise one side of the bridge circuit arrangement. The other side of a Wheatstone bridge typically comprises the unknown element or quantity to be measured in series with a third resistor. The third resistor in the present circuit is resistor $R_B$. The unknown element in this case the strain gage, $R_G$, is connected in the final position of the Wheatstone Bridge arrangement by means of switching unit 10. The present Wheatstone bridge configuration differs further from the conventional arrangement in that the power source in the present bridge circuit comprises a constant current power source 18.

The principle purpose of the present invention is to provide a method for determining both the strain and temperature using a modified three-wire circuit configuration, thereby reducing the quantity of circuits normally required from five-wires to three-wires. The present invention operates in the following manner. The static strain gage apparatus comprises of a static strain gage, $R_G$, which is connected to a Wheatstone Bridge 12 by means of three wire leads a, b, and c. In a conventional static strain gae circuits, the lead wires a, b and c are the same material, which is normally copper. In the present invention, lead wires a and c are identical and are composed of a material that is used in standard thermocouples. The lead wire b is composed of the material which is required to form a standard thermocouple with lead wire c. The signal conditioning portion of the circuit must be driven by a constant-current source and the output device must have a high-impedance input. The addition of a precision switching unit 10 permits the measurements of the strain gage output and thermocouple output. The distinguishing features of the present invention are the use of lead wire materials which permit the thermal compensation of leadwire resistance changes which are necessary for static strain measurements and the ability to make substantially instantaneous temperature measurements which are necessary for applying apparent strain correction to the strain measurement. The use of a constant-current power source instead of the more common constant-voltage power source enhances the highly accurate bridge circuit operation.

Although the invention has been described with reference to a particular embodiment, it will be understood to those skilled in the art that the invention is capable of a variety of alternative embodiments within the spirit and scope of the appended claims.

What is claimed is:

1. A three-wire static strain gage apparatus comprising in combination:

means for forming a Wheatstone bridge comprising a first, second and third resistors in series, and means for measuring strain connected to the common junction of said first and second resistors, means for switching arranged to provide respectively a complete circuit between one end of said first resistor and the other end of said strain measuring means and between one end of said third resistor and said other end of said strain measuring means in a first switch mode, said switching means providing an open circuit respectively between said first and third resistors and said other end of said strain measuring means in a second switch mode, a strain gage means having a first, second and third leadwire connected thereto, said first leadwire connected to one end of said strain gage means and to said switching means, said switching means in said first switch mode connecting said first leadwire to the non-common end of said first resistor, said second and third leadwires being connected to the other end of said strain gage means, the other end of said second leadwire being connected to said switching means which in said first switch mode connects it with said other end of said strain measuring means, the other end of said third leadwire being connected to said switching means which in said first switch mode connects it to said one end of said third resistor, and means for measuring temperature connected to said switching means which in said second switch mode connects said temperature measuring means to the non-common ends of said second and third leadwires, said strain measuring means measuring the strain in said strain gage means in said first switch mode, said temperature measuring means measuring the temperature of said second and third leadwires in said second switch mode to provide a temperature compensation reading for said gage measurement, and, a power source means connected between the common junction of said second and third resistors and said one end of said first resistor.

2. A three-wire static strain gage apparatus as described in claim 1 wherein said switch means has three poles with each pole position having a first and second switch position, said first switch position of the first pole connected to one end of said first resistor, said second switch position being open; said first switch position of the second pole connected to said other end of said strain measuring means, said second switch position of said second pole connected to one end of said temperature measuring means, said first switch position of the third pole connected to said one end of said third resistor, said second switch position of said third pole connected to the other end of said temperature measuring means, said first pole connected to said first leadwire, said second pole connected to said second leadwire and said third pole connected to said third leadwire.

3. A three-wire static strain gage apparatus as described in claim 2 wherein said second and third leadwires comprise the dissimilar metals which are used in a standard thermocouple.

4. A three-wire static strain gage apparatus as described in claim 2 wherein said power source means comprises a constant current power supply.

5. A three-wire static strain gage apparatus as described in claim 2 wherein said switch means comprises a three pole two position switch.

* * * * *